US009628757B2

(12) United States Patent
Novak et al.

(10) Patent No.: US 9,628,757 B2
(45) Date of Patent: Apr. 18, 2017

(54) DYNAMIC COMMUNICATION PORTAL BETWEEN LOCATIONS

(71) Applicant: Microsoft Technology Licensing, LLC, Redmond, WA (US)

(72) Inventors: Beth A. Novak, Woodinville, WA (US); Anton Oguzhan Alford Andrews, Seattle, WA (US); Frederick David Jones, Bellevue, WA (US); Kenneth Marks, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/995,628

(22) Filed: Jan. 14, 2016

(65) Prior Publication Data

US 2017/0048488 A1 Feb. 16, 2017

Related U.S. Application Data

(60) Provisional application No. 62/205,637, filed on Aug. 14, 2015.

(51) Int. Cl.
| | | |
|---|---|---|
| *H04N 7/15* | (2006.01) | |
| *H04N 7/14* | (2006.01) | |
| *H04L 29/06* | (2006.01) | |
| *G06F 3/01* | (2006.01) | |

(52) U.S. Cl.
CPC ............. *H04N 7/147* (2013.01); *G06F 3/017* (2013.01); *H04L 65/403* (2013.01); *H04L 65/80* (2013.01)

(58) Field of Classification Search
CPC .......... H04N 7/14; H04N 7/141; H04N 7/147; H04N 7/148; H04N 7/15; H04N 7/152

USPC ........................................... 348/14.01–14.16
See application file for complete search history.

(56) References Cited

U.S. PATENT DOCUMENTS

| | | | |
|---|---|---|---|
| 8,856,894 B1 | 10/2014 | Dean et al. | |
| 2002/0199181 A1* | 12/2002 | Allen ..................... | H04N 7/147 725/1 |
| 2003/0050834 A1 | 3/2003 | Caplan | |
| 2006/0009243 A1 | 1/2006 | Dahan et al. | |
| 2006/0031291 A1* | 2/2006 | Beckemeyer ......... | G06Q 10/10 709/204 |
| 2011/0063440 A1 | 3/2011 | Neustaedter et al. | |

(Continued)

FOREIGN PATENT DOCUMENTS

EP      2120440 B1      11/2009

OTHER PUBLICATIONS

Shaw, Gillian., "Always-on Video Portal by Perch has been Adopted by Hundreds of Companies around the Globe", Published on: May 8, 2015 Available at: http://blogs.vancouversun.com/2015/05/08/always-on-video-portal-by-perch-has-been-adopted-by-hundreds-of-companies-around-the-globe/.

(Continued)

*Primary Examiner* — Melur Ramakrishnaiah

(57) ABSTRACT

Technology is disclosed herein that enhances communication and collaboration at a distance. In an implementation, a portal engine provides a communication and content portal through which users situated in different locations may interact and collaborate with each other. The portal includes an always-on, bi-directional video link through which the users may communicate over video. The portal may also include a digital white-board or other surface link over which shared content may be exchanged.

20 Claims, 18 Drawing Sheets

(56) References Cited

U.S. PATENT DOCUMENTS

| | | | |
|---|---|---|---|
| 2011/0113354 A1 | 5/2011 | Thiyagarajan et al. | |
| 2012/0324372 A1* | 12/2012 | Kowalkiewicz | G06Q 10/101 715/753 |
| 2013/0047095 A1* | 2/2013 | Divorra Escoda | H04L 67/38 715/753 |
| 2014/0368604 A1* | 12/2014 | Lalonde | H04N 7/147 348/14.08 |

OTHER PUBLICATIONS

Burns, Chris., "Skype gets "always-on" feature for Windows Phone 8", Published on: Oct. 29, 2012 Available at: http://www.slashgear.com/skype-gets-always-on-feature-for-windows-phone-8-29254595/#disqus_thread.

Woods, Ben., "Sqwiggle Now Lets You Use Your iPad as a 'Second Screen'", Published on: Sep. 2, 2014 Available at: http://thenextweb.com/apps/2014/09/02/sqwiggle-now-lets-use-ipad-second-screen-always-team-video-chats/%2011:31%20AM/.

"Video Calling—AndroidWorks", Published on: Mar. 30, 2015 Available at: http://video-calling13.android.informer.com/.

Crecente, Brian., "Skype for PlayStation Vita coming today, brings always-on video and voice calls (update: it's live!)", Published on: Apr. 24, 2012 Available at: http://www.polygon.com/gaming/2012/4/24/2969841/skype-almost-turns-the-vita-into-a-phone-today.

"Easy HD Video Calls on Your TV", Retrieved on: May 29, 20153 Available at: https://www.biscotti.com/features.

"Cisco Jabber for Windows: Enterprise Collaboration Made Simple Data Sheet", Published on: Mar. 15, 2014 Available at: http://www.cisco.com/c/en/us/products/collateral/unified-communications/jabber-windows/data_sheet_c78-704195.html.

Good, Robin., "Live Online Collaboration: Working Side by Side", Published on: Jul. 23, 2004 Available at: http://www.kolabora.com/howto/live_online_collaboration_working_side.htm.

* cited by examiner

DYNAMIC COMMUNICATION PORTAL BETWEEN LOCATIONS

RELATED APPLICATIONS

This application is related to, claims priority to, and incorporates by reference in its entirety U.S. Provisional Patent Application No. 62/205,637, entitled "Dynamic Communication Portal Between Locations," and filed on Aug. 14, 2015.

TECHNICAL BACKGROUND

A wide variety of communication tools exist to allow people to communicate and collaborate at a distance from each other. Traditional phone conferencing systems, video conferencing systems, and other similar technologies are just some examples. Collaboration tools also allow users to collaborate on work, such as to edit shared documents and the like.

Such solutions typically require a good amount of coordination beforehand and are usually limited to people participating via their personal computing system, such as a desktop, laptop, or tablet computer, mobile phone, or other similar devices. The overall effect is relatively impersonal and lacks any of the spontaneity that might be encountered in a live, in-person situation. From a more technical perspective, all of this requires a great deal of effort, coordination, and equipment on the part of each user.

Lately it has become popular to establish an always-on video link between two locations, to allow people to interact with each other in a more spontaneous, less structured way. Sometimes this is accomplished in a relatively simple way, by two people leaving a video call on at their desks, for example. But even this approach presents drawbacks from a technical perspective, such as the lack of security and privacy, as well as the resources wasted between the two locations when the two people are not communicating.

OVERVIEW

Technology is disclosed herein that enhances communication and collaboration at a distance. In an implementation, a portal engine provides a communication and content portal through which users situated in different locations may interact and collaborate with each other. The portal includes an always-on, bi-directional video link through which the users may communicate over audio and video. The portal also includes a digital white-board or surface link over which shared content may be exchanged.

In a specific implementation, the video link renders a reduced-quality (or dormant) view of each location until the link is activated by a user on either end, at which time video from that end transitions to a high-quality image. The always-on nature of the link allows users from one location to see goings on at the other location in rough detail, until a person at the location activates their end of the portal, at which time the video transitions to finer-grained detail. Such an arrangement provides a technical effect of always-on video while preserving privacy and security to a certain extent.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
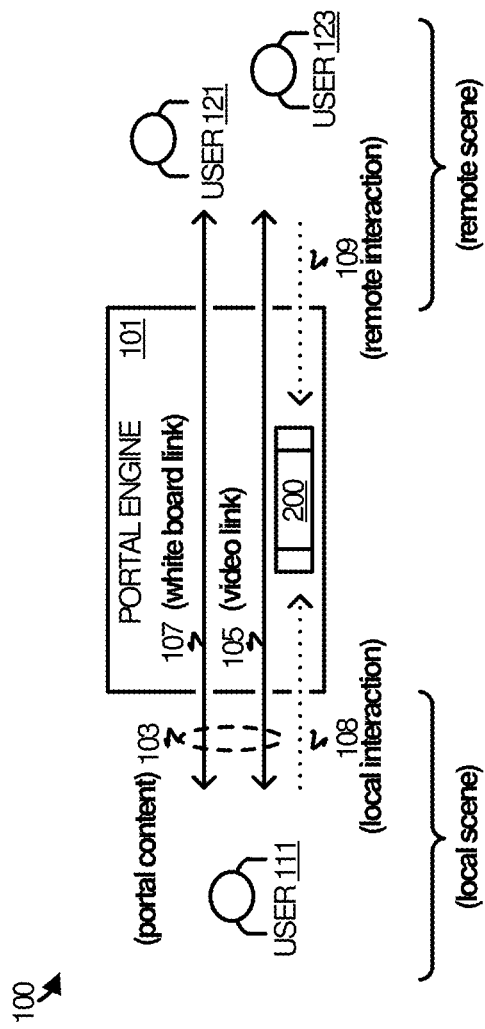
FIG. 1 illustrates an operational environment in an implementation.

FIG. 1 illustrates an operational environment in an implementation of enhanced portal technology. Operational environment 100 includes portal engine 101, which may drive a portal experience on one or more surfaces. Portal engine 101 may be implemented in software on one or more suitable computing devices, of which computing system 701 in FIG. 7 is representative. Portal engine 101 executes a process 200 in the context of driving a portal experience for one or more users.

Other elements may be included in operational environment 100, in addition to portal engine 101, such as video capture equipment, motion analyzer equipment, facial recognition equipment, surface computing equipment, and the like. Portal engine 101 may be integrated within any other element, distributed across multiple elements, or implemented as a stand-alone system.

Figure 2:
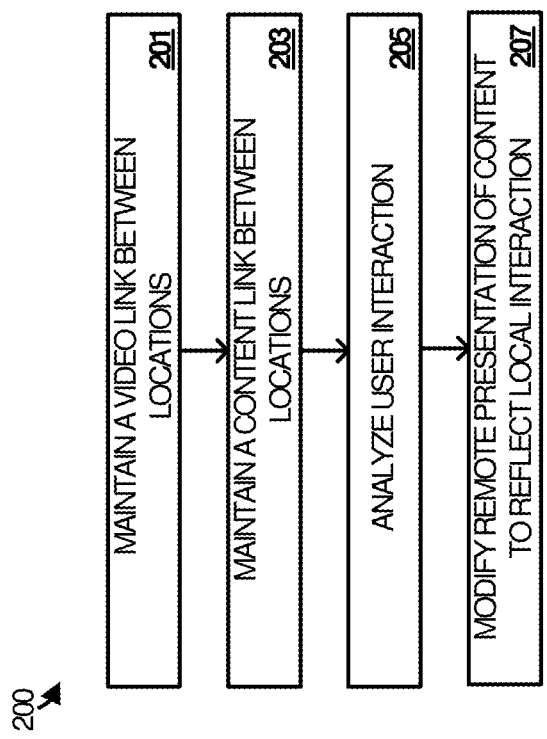
FIG. 2 illustrates a process in an implementation.

In operation, the exchange of portal content 103 is facilitated by portal engine 101. Referring parenthetically to the steps illustrated in FIG. 2, the following describes at last some of the functionality provided by portal engine when executing process 200.

Portal engine 101 maintains an always-on, bi-directional video link 105 between at least two locations, represented in FIG. 1 by the local scene and the remote scene (step 201). User 111 is situated in the local scene, while user 121 and user 123 are situated in the remote scene. The users may engage with a surface, e.g. a digital white board facilitated by a white board link 107 maintained by portal engine 101 (step 203).

The users may interact with their local environment, including speaking, gesturing, motioning, or otherwise engaging with video link 105. Likewise, the users may interact with the digital white board, such as by writing on it, touching it, gesturing towards it, holding or placing objects in proximity to it, or in any other manner. Such user input is represented by user interaction 108 and user interaction 109.

Portal engine 101 analyzes the user interactions 108 and 109 as they occur to determine whether or not, or how, to modify the presentation of portal content (step 205). When user 111 engages with the portal, for example, a remote presentation of the portal experience may be modified by portal engine 101 accordingly (step 207).

For instance, user 111 may engage with the video link in such a way that portal engine 101 transitions the link from a cold state (less detailed, obscured) to a hot state (full detail, un-obscured). In another example, a user may write on the digital white board. The content may be captured and displayed on that user's white board, but also replicated on a corresponding white board at the remote location.

Relationship recognition between shapes and other objects on the white board by portal engine 101 is also possible. As objects are manipulated by a user dragging them around, for instance, their visual relationships may remain intact, while the manipulation is replicated on the far-end of the portal.

Yet another example of the capability of portal engine 101 is the ability to recognize ordered lists of written tasks or other items. Each string can be recognized as its own self-contained object, allowing it to be manipulated like a shape. However, an overall structure of the list is also recognized, such that, as one string is manipulated, it has an impact on the positioning and layout of other strings around it.

Portal engine 101 is further capable of recognizing physical objects that are presented to a surface and rendering a virtual representation of the objects on the surface. For instance, a user might place a design sample (paint swab, carpet sample) against the surface, to be recognized and rendered virtually by portal engine 101. This allows participants on the far-end to interact with physical objects possessed by participants on the near-end.

Figure 3A:
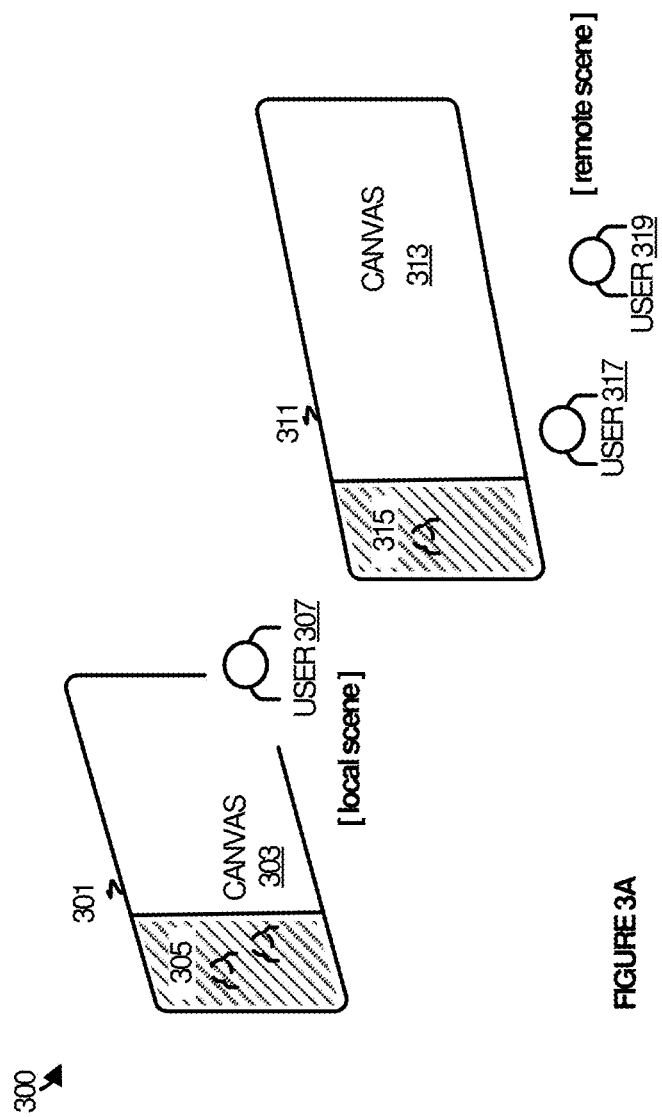
FIG. 3A-3C illustrate an operational scenario in an implementation.
Figure 3B:
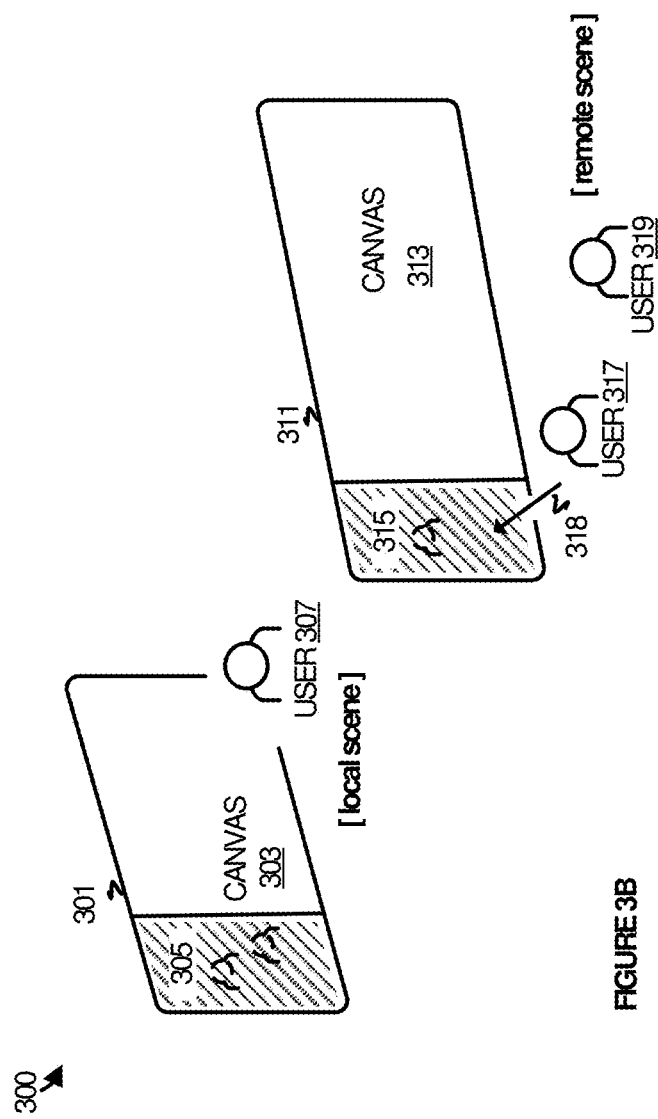
Figure 3C:
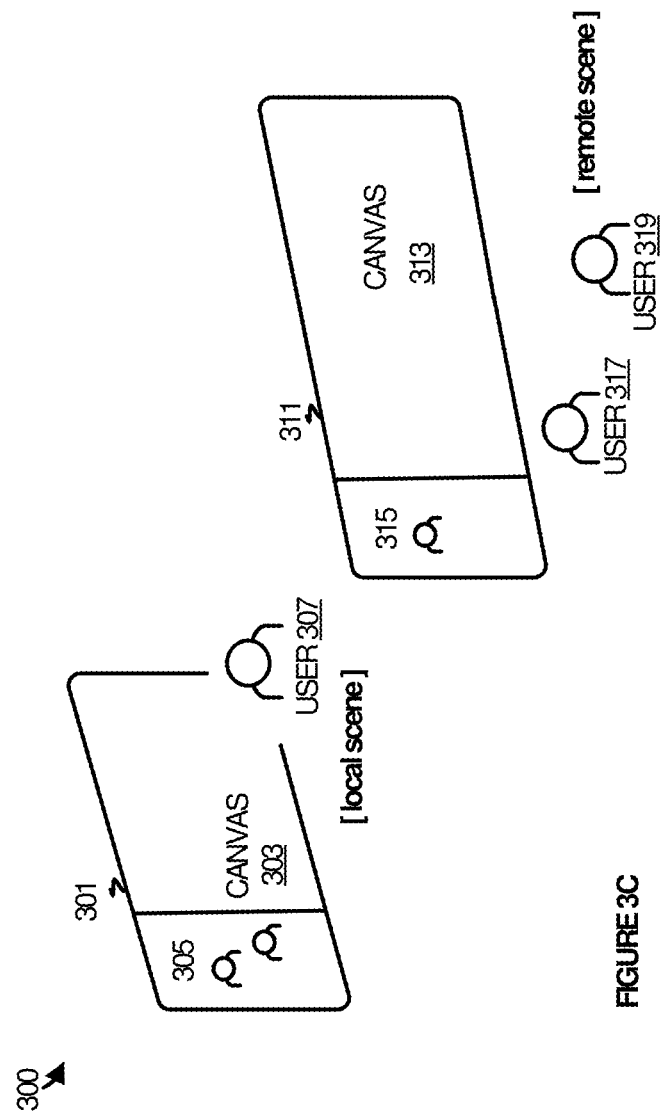

FIGS. 3A-3C illustrate one such operational scenario 300 in an implementation. In this scenario, a computing device 301 includes a digital surface comprised of a canvas 303 and a video portal 305. A user is able to write on the canvas 303 via touch, with a digital pen, or with some other suitable input mechanism. Video can be displayed via video portal 305. Video of users in the local scene (user 307) may be captured by a video capture device integrated in or separate from computing system 301.

Computing device 311 is also included in operational scenario 300. Computing device 311 also includes a canvas and a video portal 315. Thus, content may be shared between user 307 situated in a local scene and users 317 and 319 situated remotely from user 307. In addition, video portal 305 and video portal 315 may be coupled by an always-on, bi-directional video link.

In FIG. 3A, video portal 305 and video portal 315 are both in a dormant state. The video link between them is on, but the video of each respective scene is configured such that the opposing scene is obscured somewhat. For example, the video in video portal 305 shows a faint outline of two users, user 317 and user 319, while the video in video portal 315 shows a faint outline of user 305. Alternatively or additionally, any audio associated with the video may be suppressed in the dormant state.

In FIG. 3B, user 317 interacts with video portal 315, represented by interaction 318. User 317 may, for example, touch the surface, speak a command, make a particular gesture, or otherwise indicate an intent to communicate through the portal.

In response to the interaction 318, one or both of video portal 305 and video portal 315 transitions from a cold state to a hot state. In one embodiment, as the interaction 318 indicates that a person in the remote scene wishes to communicate with anyone at the far-end of the portal, video portal 305 may transition first to the hot scene. Assuming user 305 reciprocates, then video portal 315 would also transition from the cold to hot state.

Indeed, FIG. 3C illustrates both portals in their hot state. That is, the video rendered in both portals is no longer obscured in any manner, and he associated audio is activated, allowing for full communication and interaction between participants at either end of the portal.

Figure 4A:
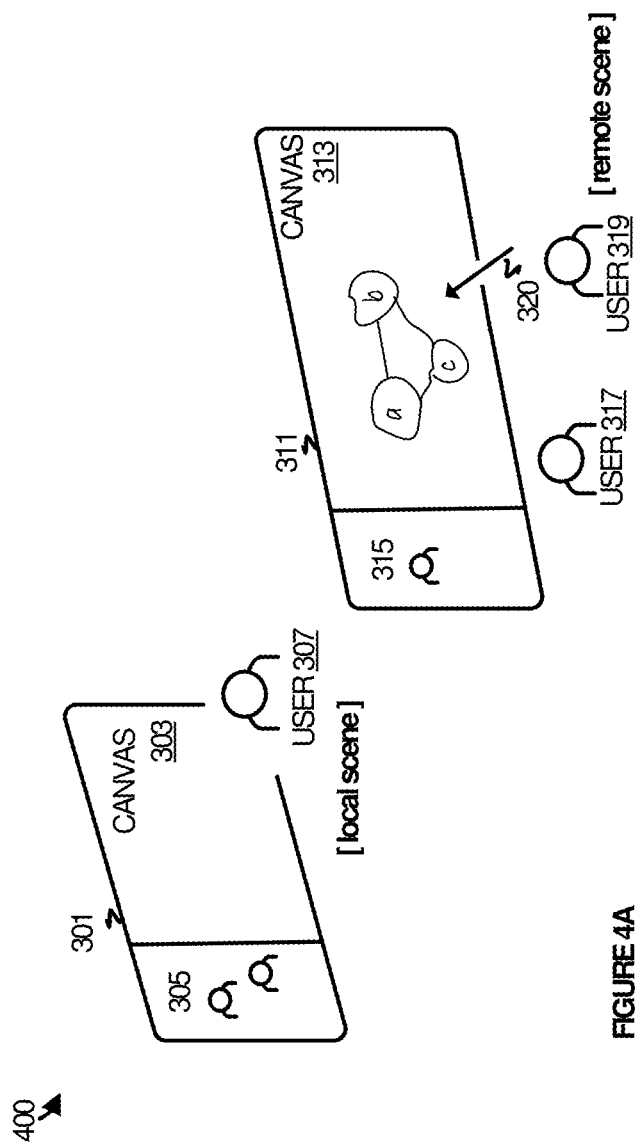
FIG. 4A-4D illustrate an operational scenario in an implementation.
Figure 4B:
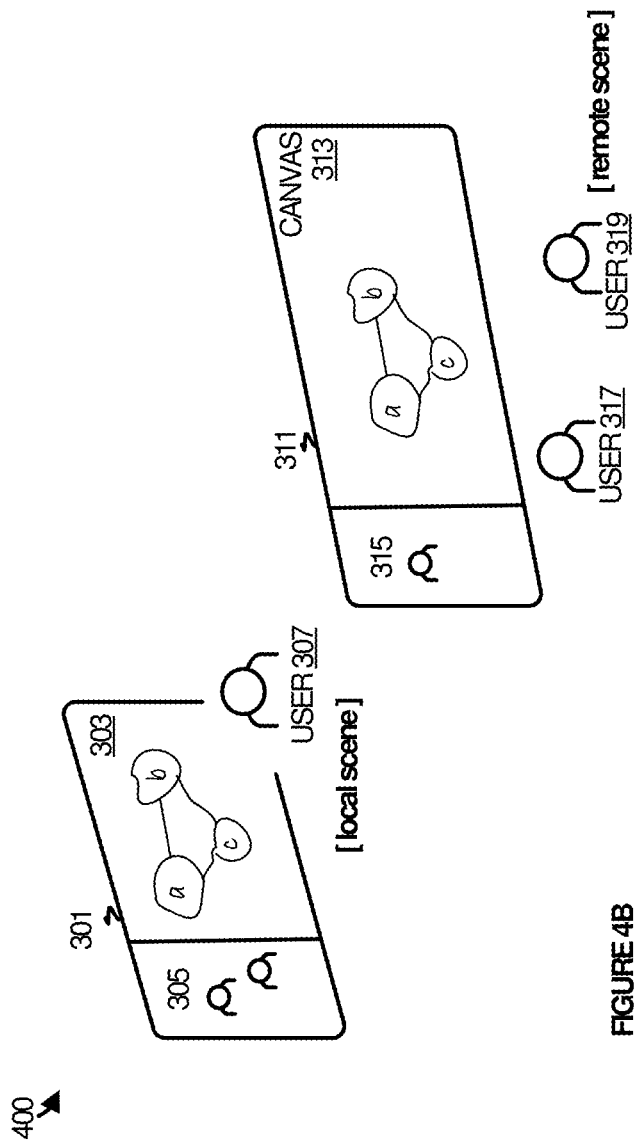
Figure 4C:
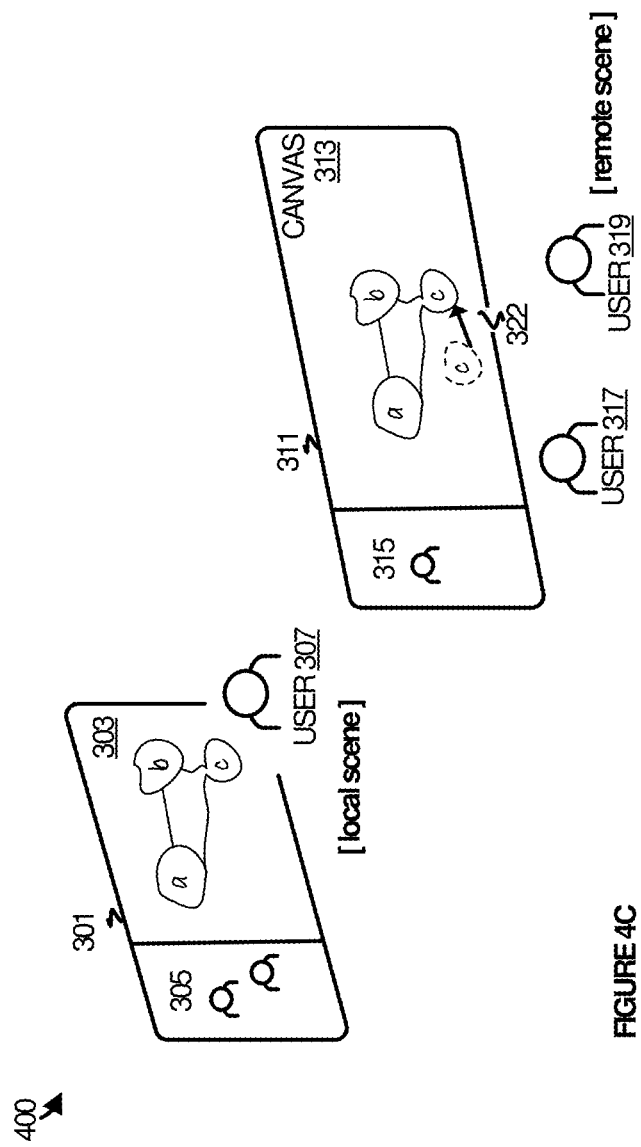

FIGS. 4A-4D illustrate an operational scenario 400 involving the same technical elements as in FIGS. 3A-3C. In FIG. 4A, a chart is drawn on canvas 313 and includes three circles (labeled A, B, and C) and connections between them (hand-drawn lines). The chart is drawn via a user interaction 320, such as by touching canvas 303, drawing on it with a digital pen, or with some other input mechanism. A portal engine recognizes the drawing and replicates it on canvas 303, as shown in FIG. 4B. In this manner, users in the remote scene may share content with users in the local scene. The same may occur in the reverse orientation, with user in the local scene sharing with remote users.

The portal engine also recognizes the relationships implied by the connections drawn between each circular shape. A is connected to B and C; B is connected to A and C; and C is connected to B and A. Thus, when C is moved by a user interaction 322 with the canvas 313 in FIG. 4C, the relationships are maintained between the shapes. The manipulation is also reflected in the version rendered on canvas 303.

Figure 4D:
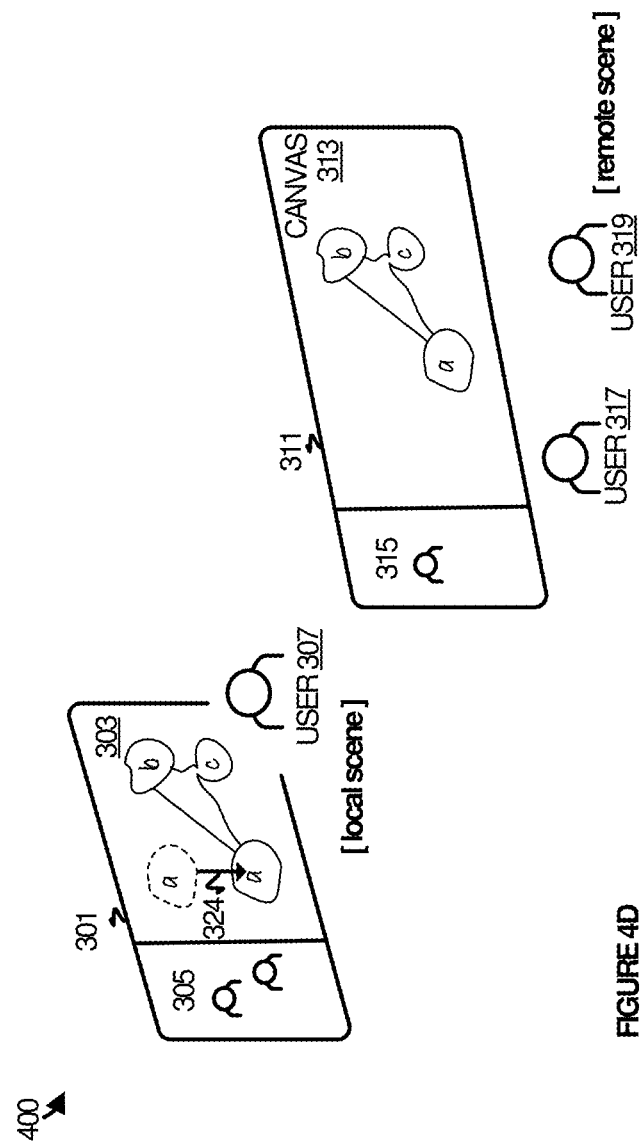

FIG. 4D illustrates that the manipulation and interaction may be bi-directional. That is, user 307 may also interact with the drawing in such a collaborative way. In FIG. 4D, the shape labeled A is pulled down by user interaction 324, which is reflected on canvas 303 but also on canvas 313.

Figure 5A:
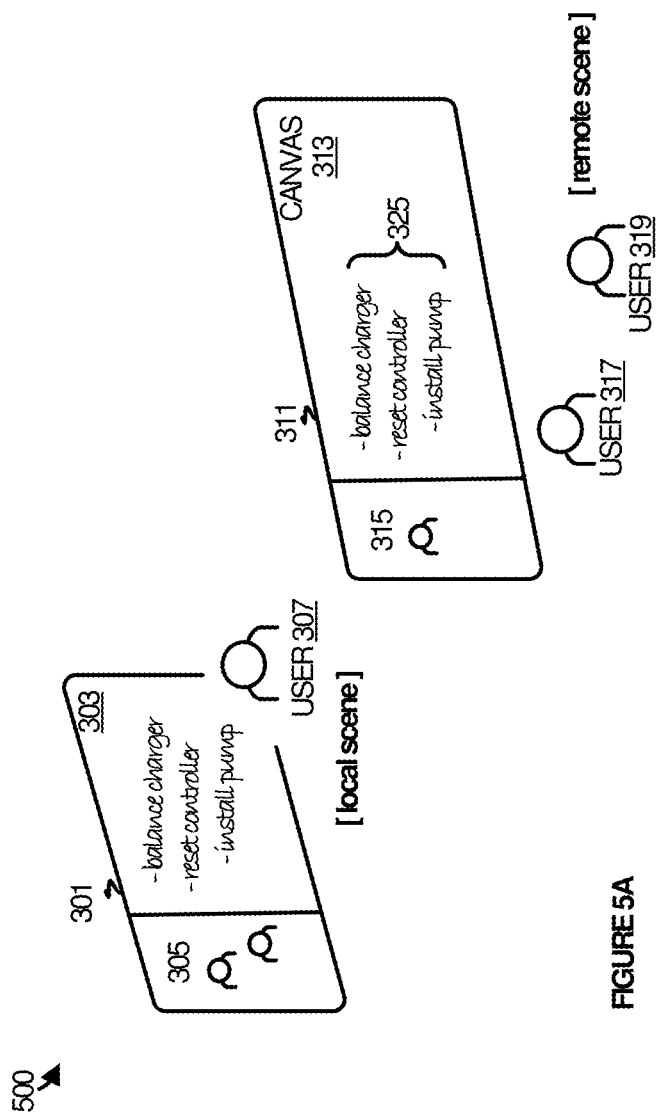
FIG. 5A-5C illustrate an operational scenario in an implementation.
Figure 5B:
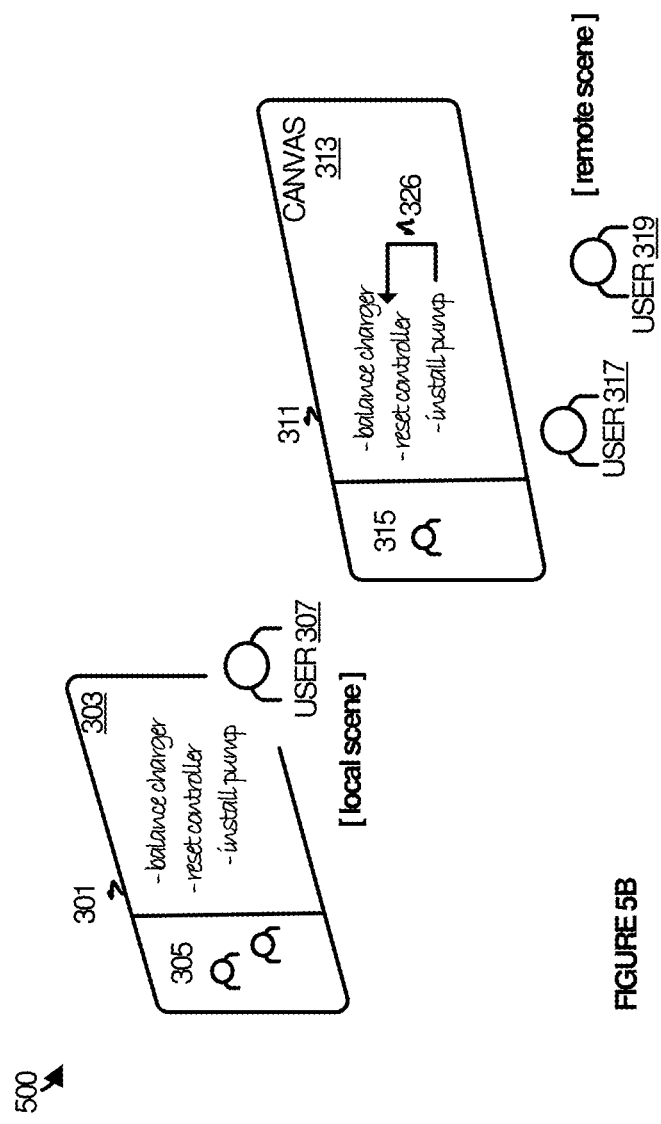
Figure 5C:
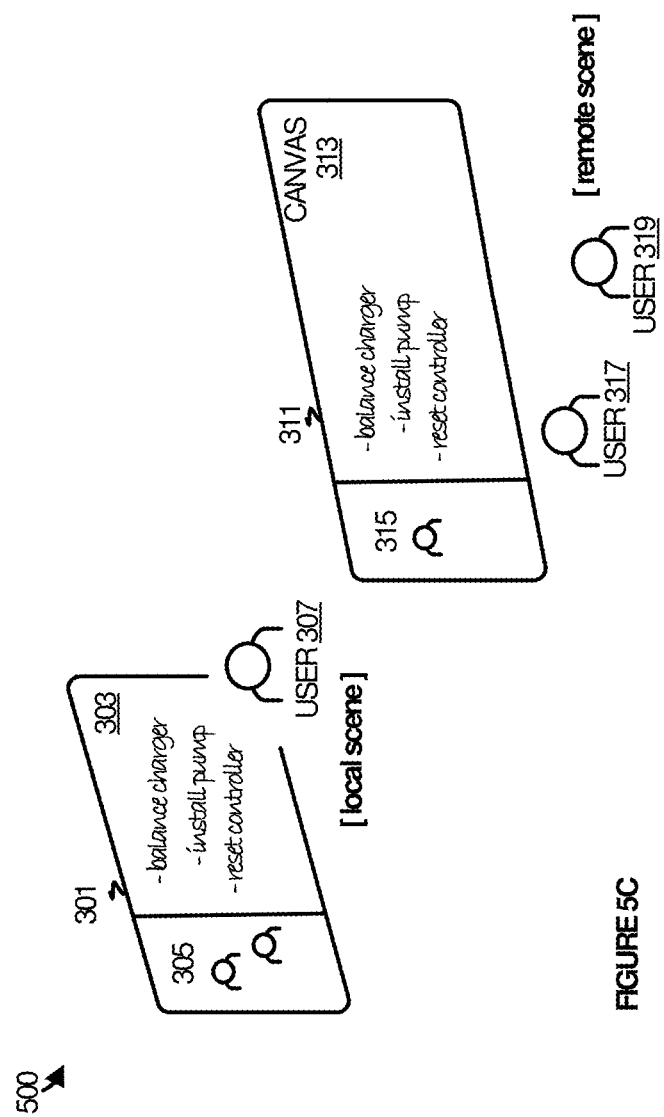

FIGS. 5A-5C illustrate another operational scenario 500 also involving the same technical elements as in FIGS. 3A-3C. In FIG. 5A, a list 325 has been written on canvas 313. A portal engine monitors what is being written on canvas 313 and how it is being written in order to recognize individual tasks, items, or elements in the list. The writing is replicated on canvas 303 so that user 307 can see what users 317 and 319 have written.

The list has an order implied by the order in which the elements were written on the canvas. In addition, the list has a comprehensive structure that is recognized by the portal engine. This allows elements within the list to be manipulated by users and re-ordered by dragging and dropping the elements. FIG. 5B illustrates an example whereby a manipulation 326 moves the third element in the list ("install pump") to the second place in the list. The manipulation is detected by the portal engine and the third element replaces the second. As shown in FIG. 5C, the second element is automatically pushed down in the list, even though the manipulation 326 does not involve the second element. The re-ordering of the list is also reflected on canvas 303.

Figure 6A:
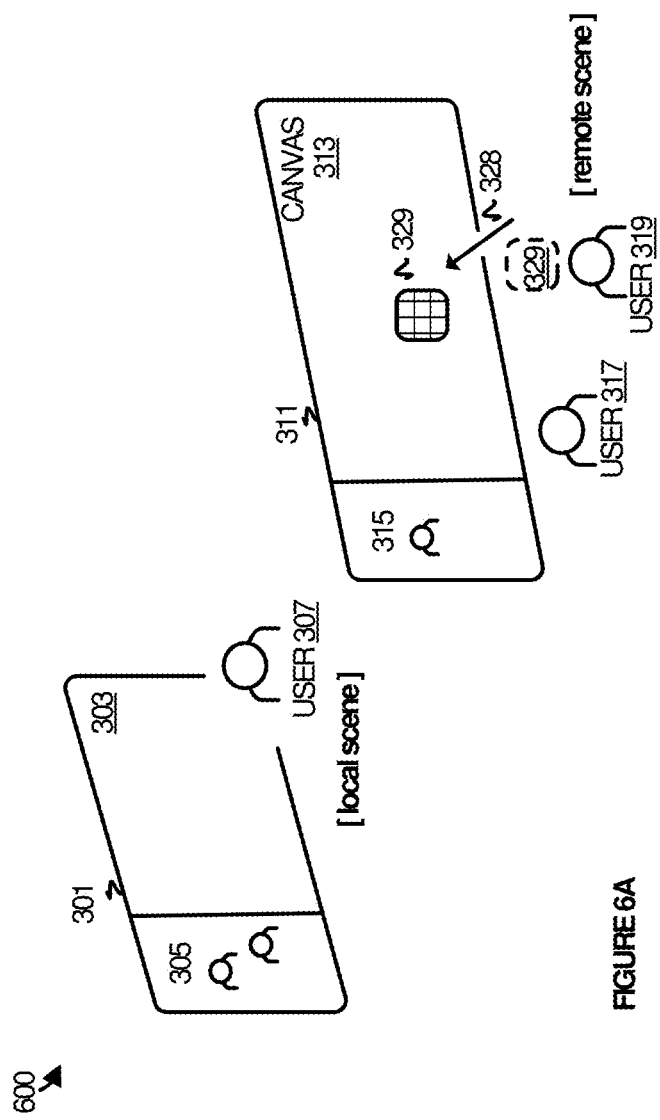
FIG. 6A-6B illustrate an operational scenario in an implementation.
Figure 6B:
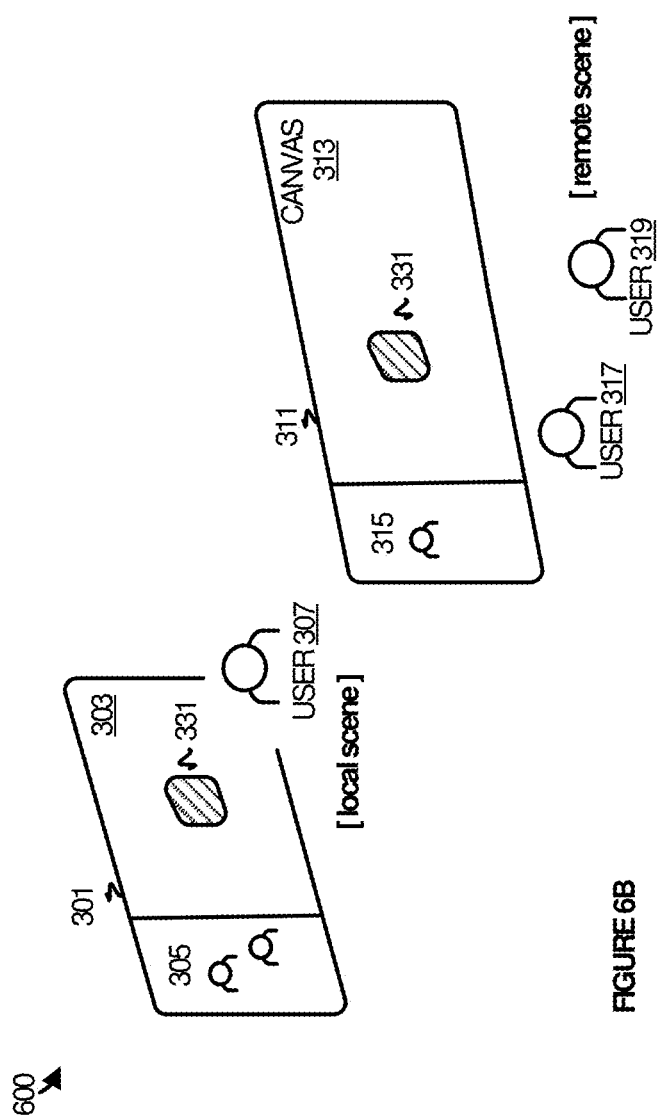

FIGS. 6A-6B illustrate another operational scenario 600 that involves the technical elements from FIGS. 3A-3C. In this scenario, user 319 holds a physical object 329 against canvas 313. In FIG. 6A, the movement of the object from a non-proximate location to a location proximate to the canvas 313 triggers a portal engine to analyze and identify the object. This may be accomplished using video recognition techniques or the like.

In FIG. 6B, a virtual representation 331 of the object is rendered on canvas 313. In addition, the virtual representation 331 is rendered on canvas 303. This allows users 317 and 319 to share physical objects with user 303, located remotely from them. User 303 can inspect the virtual representation 331 of the object, for example.

Figure 7A:
FIGS. 7A-7C illustrate an operational scenario in an implementation.
Figure 7B:
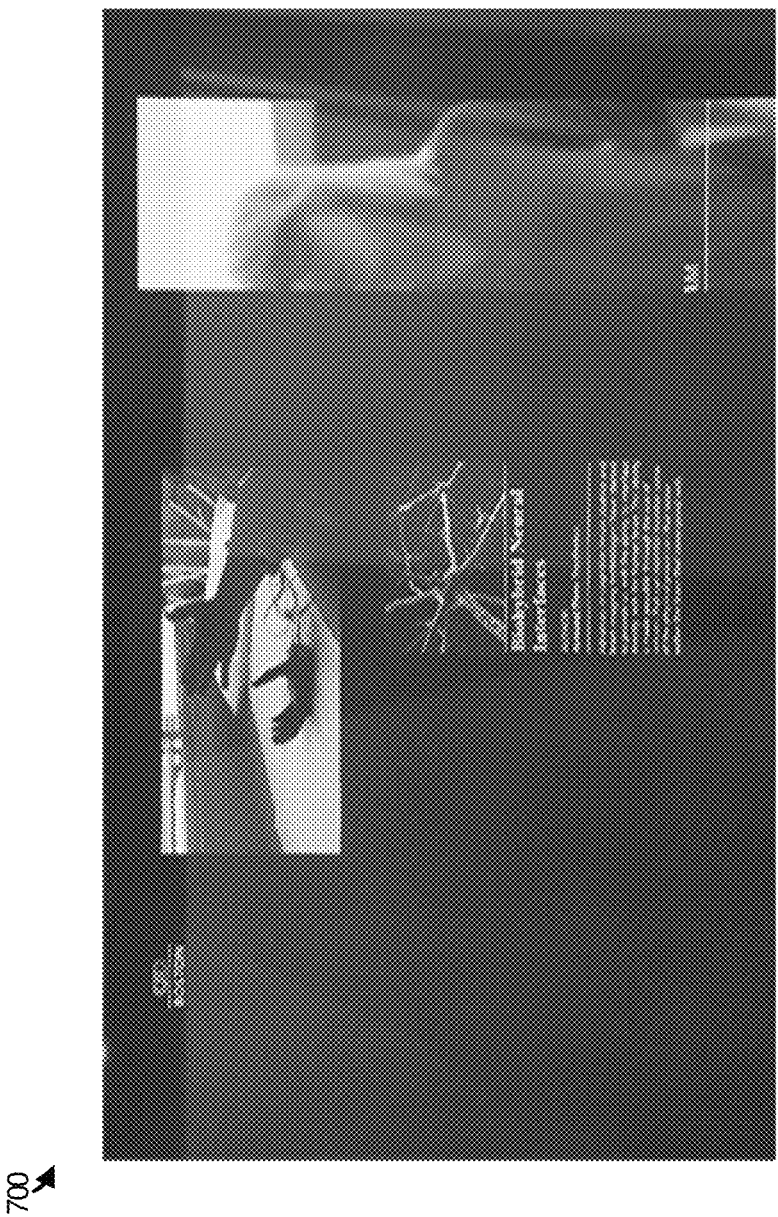
Figure 7C:

FIGS. 7A-7C illustrate an operational scenario 700 representative of a video portal and its transition from a cold state to a hot state. In FIG. 7A, the video portal is cold from the perspective of a local user viewing the video portal. A scene at the far-end can be seen, but with limited detail. Other information is displayed on the canvas adjacent to the portal.

In FIG. 7B, a user approaches the portal at the far-end and triggers its transition (at the near-end) to a hot state. The portal begins to expand horizontally and the video is clarified. In FIG. 7C, the video portal has transitioned fully to a hot state.

Still referring to FIGS. 7A-7C, the portal technology disclosed herein allows local and remote teams to bridge the geographic divide and collaborate in person in both a planned and an ad hoc manner. Sometimes referred to as a "warm" portal, because it is an always-on connection to a remote location that changes state depending on the engagement of team members, the warm portal can be on any touch surface or non-touch surface with a camera and audio capabilities.

People in either location can "engage" with the portal by touching the touch surface or programmatically using recognition on a non-touch surface. When "at rest," the warm portal appears as a narrow, black and white, "hazed" vertical strip in some implementations.

Because it is always on, one can see movement as people cross in and out of the viewing area, however the "hazing" of the view doesn't show crisp detail (for privacy, bandwidth, and/or other purposes). When engaged, the warm portal goes "hot," flooding to twice its "at rest" width and becoming in-focus and full color where possible.

Figure 8:
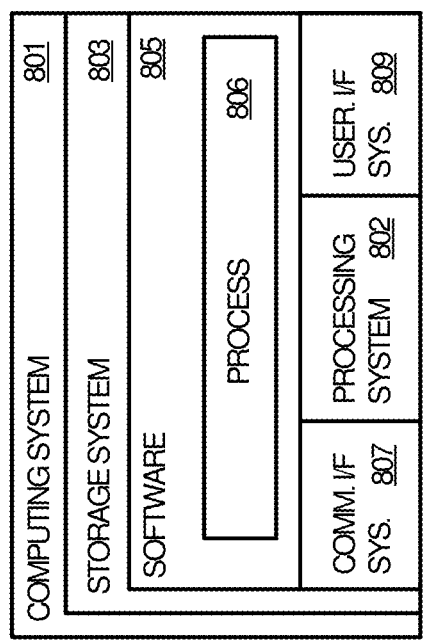
FIG. 8 illustrates a computing system suitable for implementing the portal technology disclosed herein, including any of the environments, architectures, elements, processes, and operational scenarios and sequences illustrated in the Figures and discussed below in the Technical Disclosure.

Remote participants can engage with local team members naturally and at a comfortable, conversational angle. When participants disengage, the warm portal returns to its "at rest" state FIG. 8 illustrates computing system 801 that is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes process 806, which is representative of the processes discussed with respect to the preceding FIGS. 1-7, including process 200. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing enhanced portal communication and collaboration.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include process 806. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to facilitate enhanced communication and collaboration. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1

A computing apparatus comprising: one or more computer readable storage media; a processing system operatively coupled with the one or more computer readable storage media; and program instructions stored on the one or more computer readable storage media that, when read and executed by the processing system, direct the processing system to at least: maintain a bi-directional video link between a plurality of locations comprising video captured of each of the plurality of locations; present a dormant view of each location captured in the video on a display surface at each other location until the video link is activated by user interaction with the display surface at any one of the plurality of locations; and when the video link is activated by the user interaction, transition the dormant view to an active view of at least the location where the user interaction occurred.

Example 2

The computing system of Example 1 wherein the dormant view has a reduced quality relative to a higher quality of the active view.

Example 3

The computing system of Examples 1-2 the reduced quality comprises an out-of-focus effect and wherein the higher quality comprises an in-focus effect.

Example 4

The computing system of Examples 1-3 wherein the reduced quality further comprises a reduced width of the video and wherein the higher quality comprises an expanded width.

Example 5

The computing system of Examples 1-4 wherein the reduced quality further comprises a limited-color effect and wherein the higher quality comprises a full-color effect.

Example 6

The computing system of Examples 1-5 wherein the reduced quality further comprises a reduced width of the video and wherein the higher quality comprises an expanded width.

Example 7

The computing system of Examples 1-6 wherein the user interaction comprises a touch on the display surface to initiate the transition from the dormant view to the active view.

Example 8

The computing system of Examples 1-7 wherein the program instructions further direct the processing system to present a shared digital whiteboard adjacent to the video on the display surface at each of the plurality of locations.

Example 9

A method of operating a bi-directional video link maintained between a plurality of locations, the method comprising: capturing video of each of the plurality of locations; presenting a dormant view of each location captured in the video on a display surface at each other location until the video link is activated by user interaction with the display surface at any one of the plurality of locations; and when the video link is activated by the user interaction, transitioning the dormant view to an active view of at least the location where the user interaction occurred.

Example 10

The method of Example 9 wherein the dormant view has a reduced quality relative to a higher quality of the active view.

Example 11

The method of Examples 9-10 wherein the reduced quality comprises an out-of-focus effect and wherein the higher quality comprises an in-focus effect.

Example 12

The method of Examples 9-11 wherein the reduced quality further comprises a limited-color effect and wherein the higher quality comprises a full-color effect.

Example 13

The method of Examples 9-12 wherein the reduced quality further comprises a reduced width of the video and wherein the higher quality comprises an expanded width.

Example 14

The method of Examples 9-13 wherein the user interaction comprises a touch on the display surface to initiate the transition from the dormant view to the active view.

Example 15

The method of Examples 9-14 further comprising presenting a shared digital whiteboard adjacent to the video on the display surface at each of the plurality of locations.

Example 16

A method of operating an online portal between at least two locations comprising: maintaining an always-on, bi-directional video link between a plurality of locations; maintaining a content link between the plurality of locations; analyzing user interaction at each of the plurality of locations; modifying a remote presentation of content at each other of the plurality of locations to reflect the user interaction at any one of the plurality of locations.

Example 17

The method of Example 16 further comprising: capturing video of each of the plurality of locations; presenting a dormant view of each location captured in the video on a display surface at each other location until the video link is activated by additional user interaction with the display surface at any one of the plurality of locations; and when the video link is activated by the additional user interaction, transitioning the dormant view to an active view of at least the location where the user interaction occurred.

Example 18

The method of Examples 16-17 further comprising: presenting a shared whiteboard adjacent to the video on the display surface at each of the plurality of locations; and rendering the remote presentation of the content on the shared whiteboard space at each of the plurality of locations.

Example 19

The method of Examples 16-18 further comprising recognizing a physical object that is presented to the display surface and rendering a virtual representation of the object on the display surface.

Example 20

The method of Examples 16-19 wherein the user interaction comprises a touch interaction with the virtual representation of the object.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
one or more computer readable storage media;
a processing system operatively coupled with the one or more computer readable storage media; and
program instructions stored on the one or more computer readable storage media that, when read and executed by the processing system, direct the processing system to at least:
maintain a bi-directional video link between a plurality of locations comprising video captured of each of the plurality of locations, wherein the bi-directional video link comprises a first video associated with a first location and a second video associated with a second location;
present a dormant view of the first video, wherein the dormant view obscures display of the first video by presenting a partial view of the first location; and
transition, in response to an indication of a user interaction with a display surface at the first location, the dormant view of the first video to an active view that un-obscures display of the first video.

2. The computing system of claim 1, wherein the active view increases a quality level of a video stream of the first video to full fidelity.

3. The computing system of claim 2, wherein the active view activates an audio link associated with the first video.

4. The computing system of claim 1, wherein the program instructions further direct the processing system to: transition, based on an indication of a user interaction with a display surface at the second location, the second video to an active view that un-obscures display of the second video.

5. The computing system of claim 4, wherein the active view of the second video increases a quality level of a video stream of the second video to full fidelity and activates an audio link associated with the second video.

6. The computing system of claim 1, wherein the program instructions further direct the processing system to present a shared digital whiteboard associated with the first location.

7. The computing system of claim 1, wherein the user interaction comprises a touch on the display surface to initiate a transition from the dormant view to the active view.

8. The computing system of claim 1, wherein the first video further comprises a surface view that creates a virtual representation of one or more items associated with the display surface.

9. A method comprising:
maintaining a bi-directional video link between locations, wherein the bi-directional video link comprises a first video associated with a first location and a second video associated with a second location;
presenting a dormant view of the first video, wherein the dormant view obscures display of the first video by presenting a partial view of the first location; and
transitioning, in response to an indication of a user interaction with a display surface at the first location, the dormant view to an active view that un-obscures display of the first video.

10. The method of claim 9, wherein the active view increases a quality level of a video stream of the first video and activates an audio link associated with the first video.

11. The method of claim 10, further comprising transitioning, based on an indication of a user interaction with a display surface at the second location, the second video to an active view that un-obscures display of the second video, wherein the active view of the second video increases a quality level of a video stream of the second video and activates an audio link for the second video.

12. The method of claim 9, further comprising presenting a shared digital whiteboard associated with the first location.

13. The method of claim 9, wherein the first video further comprises a surface view that creates a virtual representation of one or more items associated with the display surface.

14. The method of claim 9, wherein the user interaction comprises a touch on the display surface to initiate a transition from the dormant view to the active view.

15. A computer-readable storage device that comprises computer-executable instructions which, when executed by at least one processor, causes the at least one processor to execute a method comprising:
maintaining a bi-directional video link between locations, wherein the bi-directional video link comprises a first video associated with a first location and a second video associated with a second location;
presenting a dormant view of the first video, wherein the dormant view obscures display of the first video by presenting a partial view of the first location; and
transitioning, in response to an indication of a user interaction with a display surface at the first location, the dormant view to an active view that un-obscures display of the first video.

16. A computer-readable storage device of claim 15, wherein the active view increases the quality level of a video stream of the first video and activates an audio link associated with the first video.

17. A computer-readable storage device of claim 15, wherein the method, executed by the at least one processor, further comprising transitioning, based on an indication of a user interaction with a display surface at the second location, the second video to an active view that un-obscures display of the second video, wherein the active view of the second video increases a quality level of a video stream of the second video and activates an audio link for the second video.

18. A computer-readable storage device of claim 15, wherein the method, executed by the at least one processor, further comprising presenting a shared digital whiteboard associated with the first location.

19. A computer-readable storage device of claim 15, wherein the user interaction comprises a touch on the display surface to initiate a transition from the dormant view to the active view.

20. A computer-readable storage device of claim 15, wherein the first video further comprises a surface view that creates a virtual representation of one or more items associated with the display surface.

* * * * *